United States Patent
Ouellette (10) Patent No.: US 6,390,282 B1
(45) Date of Patent: May 21, 2002

(54) HORIZONTAL BELT CONVEYOR WITH QUICK VERTICAL ADJUSTMENT

(75) Inventor: Joseph F. Ouellette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 0 days.

(21) Appl. No.: 09/603,544

(22) Filed: Jun. 26, 2000

(51) Int. Cl.⁷ .................. B65G 15/12; B65G 15/14; B65G 15/20
(52) U.S. Cl. ................. 198/626.5; 198/821.1; 198/502.2
(58) Field of Search ............ 198/626.5, 821.1, 198/502.2

(56) References Cited

U.S. PATENT DOCUMENTS

| | | | | |
|---|---|---|---|---|
| 3,901,381 A | * | 8/1975 | Quinn | 198/283 |
| 3,905,177 A | * | 9/1975 | Herzog | 198/165 |
| 4,934,510 A | * | 6/1990 | Lutgendorf | 198/461 |
| 5,573,103 A | * | 11/1996 | Novak et al. | 198/604 |
| 5,896,977 A | * | 4/1999 | Ouellette | 198/415 |
| 5,915,526 A | * | 6/1999 | Dewees et al. | 198/832.2 |
| 6,250,851 B1 | * | 6/2001 | Ouellette et al. | 406/81 |

* cited by examiner

Primary Examiner—Paul N. Dickson
Assistant Examiner—Devon Kramer
(74) Attorney, Agent, or Firm—Thompson Coburn LLP (57) ABSTRACT

A conveyor system comprises pairs of vertically spaced and horizontally oriented pulleys and belts that are positioned on opposite sides of a conveyor path. The belts wrap around the pulleys and engage with opposite sides of an object being conveyed by the conveyor, for example an empty plastic blow molded bottle, and convey the object along the conveyor path between the belts. A vertical adjustment mechanism quickly adjusts the vertical positioning of the pairs of pulleys and belts on each side of the conveyor path to quickly adapt the conveyor for conveying different sized objects.

20 Claims, 6 Drawing Sheets

HORIZONTAL BELT CONVEYOR WITH QUICK VERTICAL ADJUSTMENT

BACKGROUND OF THE INVENTION (1) Field of the Invention

The present invention pertains to a conveyor system comprising pairs of vertically spaced and horizontally oriented pulleys and belts that are positioned on opposite sides of a conveyor path. The belts wrap around the pulleys and engage with opposite sides of an object being conveyed by the conveyor, for example an empty plastic blow molded bottle, and convey the object along the conveyor path between the belts. More specifically, the present invention pertains to an apparatus that quickly adjusts the vertical positioning of the pairs of pulleys and belts on each side of the conveyor path to quickly adapt the conveyor for conveying different sized objects.

(2) Description of the Related Art

One type of horizontal belt conveyor that conveys objects in upright orientations between opposed, laterally spaced belts of the conveyor is disclosed in U.S. Pat. No. 5,896,977 which issued on Apr. 27, 1999, and is assigned to the assignee of the present invention and is incorporated herein by reference. This type of belt conveyor is basically comprised of pairs of vertically oriented upstream and downstream shafts where the upstream shafts are laterally spaced on opposite sides of the conveyor path and the downstream shafts are laterally spaced on opposite sides of the conveyor path. Each shaft has an upper and lower pulley mounted to the shaft. The pulleys are typically secured against rotation relative to the shafts by keyways formed in the shafts and keys inserted between the pulleys and shafts. In addition, the pulleys are secured against axial movement on the shafts by set screws on the pulleys or other equivalent mechanisms typically employed in securing a pulley to a shaft. Belts are wrapped around the upper pulleys and around the lower pulleys of the upstream and downstream shafts on each side of the conveyor path. One of the shafts on each side of the conveyor path, either the upstream shaft or the downstream shaft, is rotated by a motive source and rotates the other shaft through the driving engagement of the belts wrapped around the upper and lower pulleys of the two shafts. The shafts are all driven at the same speeds and the pairs of shafts on opposite sides of the conveyor path are driven in opposite directions so that the portions of the belts that mutually oppose each other on opposite sides of the conveyor path travel at the same speed in the downstream direction.

The lateral spacing between the pulleys and their belts and the vertical spacing between the pulleys and their belts is determined by the size of the object being conveyed by the conveyor. For example, in conveying empty plastic blow molded bottles, the shape of the bottle determines the positioning of the pulleys on their shafts. Plastic bottles of this type are used as containers for carbonated beverages and other types of beverages. The bottles usually have an upper throat opening that is threaded on its exterior for receiving a cap. As the bottle extends downwardly from the throat, it tapers outwardly along a neck to an annular shoulder defining the upper portion of the main receptacle or body of the bottle. However, the circumference or diameter of the main receptacle or body of the bottle does not always remain constant as the bottle extends downwardly from its shoulder to the bottom of the bottle. More frequently, producers of beverages contained in plastic bottles have designed their own bottle configurations to assist consumers in identifying their products and distinguishing the products of others. For example, the main body of a bottle may begin with a flat exterior circumferential surface just below the bottle shoulder and then may curve inwardly and outwardly as the body extends downward to the bottom of the bottle. The bottom of the bottle also typically has a flat exterior circumferential surface around the bottom that is generally dimensioned at the same size as the circumferential surface of the body just below the shoulder to give the bottle upright stability.

In conveyor systems of the type described above, the efficiency of the conveyor system is dependent on the speed in which it conveys objects through the conveyor system. In horizontal belt conveyors of the type described above, when the conveyor system is switched from conveying one bottle configuration to another bottle configuration it is often necessary to reposition the pulleys on their shafts so that the belts wrapped between the upper and lower pulleys of the upstream and downstream shafts will engage against portions of the bottle body that will hold the bottles securely between the belts in their upright orientations as they are conveyed down the conveyor path. In order to reposition the pulleys and their belts vertically on the shafts, the conveyor system must be shut down. The period of time that the conveyor system is shut down while vertical repositioning of the pulleys and belts is taking place significantly detracts from the time efficiency of the overall conveyor system. What is needed to overcome this disadvantage in horizontal belt conveyor systems is a method of quickly adjusting the vertical positions between the pulleys and their belts on the upstream and downstream shafts to decrease the down time of the conveyor system and improve its overall time efficiency.

SUMMARY OF THE INVENTION

The present invention overcomes the disadvantages of prior art horizontal belt conveyors by providing a horizontal belt conveyor in which the pulleys mounted on each of the vertically oriented shafts can be quickly adjusted vertically relative to each other Each pair of vertically oriented upstream and downstream shafts and the pulleys and belts mounted thereon are supported on a base that can be laterally adjusted toward and away from the conveyor path. Each of the vertically oriented shafts has an upper pulley and a lower pulley mounted on the shaft. The pulleys are keyed to the shafts so that they will rotate with the shafts, however they are free to slide vertically along the lengths of the shafts.

The upper pulleys on the upstream and downstream shafts on each side of the conveyor path are sandwiched between a pair of plates that also move upwardly and downwardly over the shafts. In a like manner, the lower pulleys on the upstream and downstream shafts on each side of the conveyor plate are sandwiched between a pair of horizontal plates. Additional tensioning rollers are mounted between each pair of plates. The belts wrapped around the upper and lower pulleys on the upstream and downstream shafts on each side of the conveyor path are also positioned between the pairs of horizontal plates. By adjusting the vertical positions of the plates along the upstream and downstream shafts, the positions of the pulleys sandwiched between the plates are also vertically adjusted on the upstream and downstream shafts.

A vertical adjustment mechanism is mounted on the base of the conveyor and is operatively connected with each pair of horizontal plates that sandwich the upper and lower pulleys on each side of the conveyor path. The vertical adjustment mechanism includes a pair of vertically oriented racks that extend upwardly from the base and pass through each pair of plates. The vertical adjustment mechanism also includes a horizontal shaft mounted between each pair of horizontal plates and a pair of pinion gears mounted on the shaft. Each pinion gear meshes with one of the vertically oriented racks. One end of the shaft projects out from between the pair of horizontal plates and a hex head is secured to the end of the shaft. A ratchet wrench is provided that is specifically designed to mate with each of the hex heads on the shafts. Turning the hex head with the ratchet wrench causes the shaft and its attached pair of gears to turn. Turning the gears in this manner causes them to walk either vertically upwardly or downwardly along the vertically oriented racks depending on the direction of rotation of the shaft. This in turn causes the pairs of horizontal plates with the pulleys sandwiched between them to move vertically upwardly and downwardly along the vertically oriented shafts, thereby adjusting the vertical positions of the upper and lower pulleys and their belts relative to each other on each side of the conveyor path.

The conveyor is also provided with a vertically oriented scale adjacent upper and lower pulleys on each side of the conveyor path that provides a visual indication of the vertical positioning of the upper and lower pulleys. The vertical scale is mounted to the base of the conveyor by a pivoting connection that enables the scale to be pivoted away from the upper and lower pulleys to replace belts on the pulleys.

The horizontal belt and pulley conveyor discussed above enables the vertical positioning of the pulleys and their belts on upstream and downstream shafts to be easily and quickly adjusted, thus reducing the down time of the conveyor and improving its time efficiency.

DESCRIPTION OF THE DRAWINGS

Further features of the invention are revealed in the following detailed description of the preferred embodiment of the invention and in the drawing figures wherein.

DETAILED DESCRIPTION OF THE PREFERRED EMBODIMENT

Figure 1:
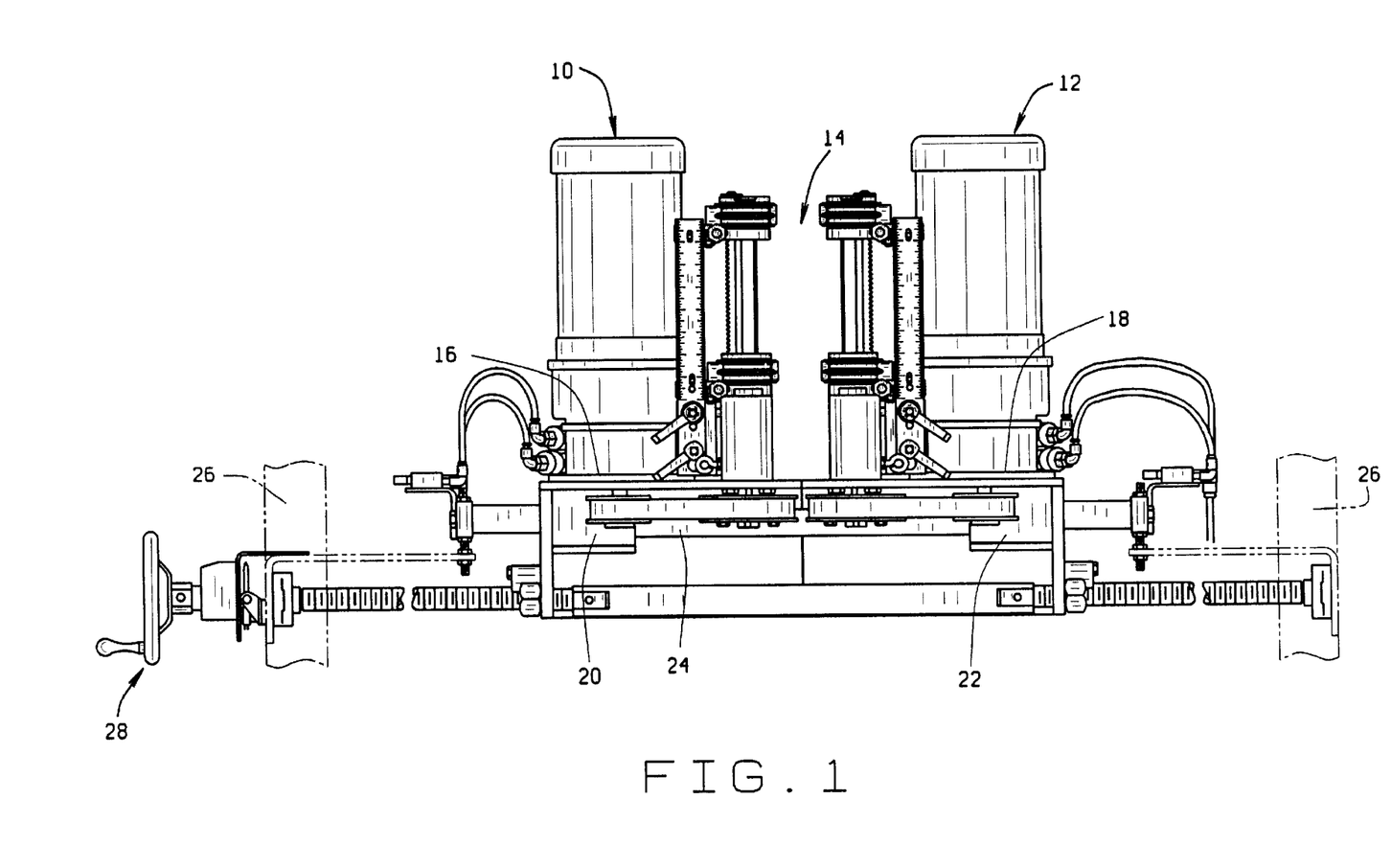
FIG. 1 is an end elevation view of two of the horizontal belt conveyors of the invention positioned opposite each other on opposite sides of a conveyor path.

The horizontal belt and pulley conveyor of the invention is an improvement over prior art horizontal belt and pulley conveyors of the type disclosed in U.S. Pat. No. 5,896,977, which issued Apr. 27, 1999 and is assigned to the assignee of the present invention and is incorporated herein by reference. FIG. 1 shows an end view of the conveyor that is basically constructed of a first belt and pulley system 10 and a second belt and pulley system 12 that are mirror images of each other and are positioned opposite each other on opposite sides of a conveyor path 14. Like the prior art conveyor of the above referenced patent, the two belt and pulley systems 10, 12 are each mounted on a table half. The table includes table tops 16, 18 that are mounted by slide bushings 20, 22 on laterally extending guide rods 24 supported on the frame 26 of the conveyor. The table tops 16, 18 and the conveyors 10, 12 slide over the guide rods 24 and are laterally adjusted toward and away from each other by manually turning a lateral spacing adjustment mechanism 28 in opposite directions. This adjusts the lateral width of the conveyor path 14 between the two conveyor systems 10, 12 to accommodate objects, such as empty blow molded plastic bottles, having different width dimensions. Because both of the belt and pulley conveyor systems 10, 12 of the invention are the same, only one will be described in detail.

Figure 2:
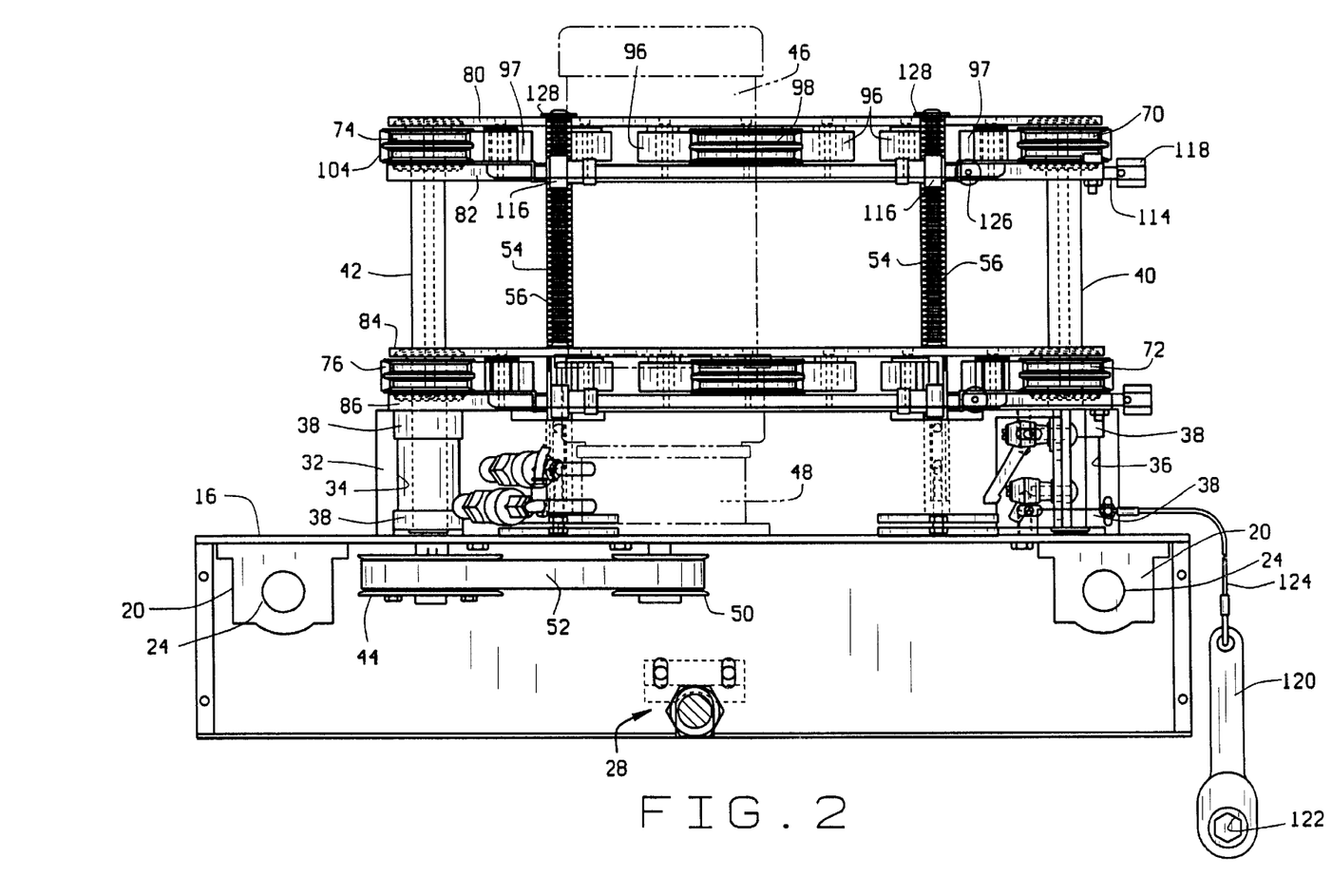
FIG. 2 is a side elevation view of one of the horizontal belt conveyors of FIG. 1.
Figure 3:
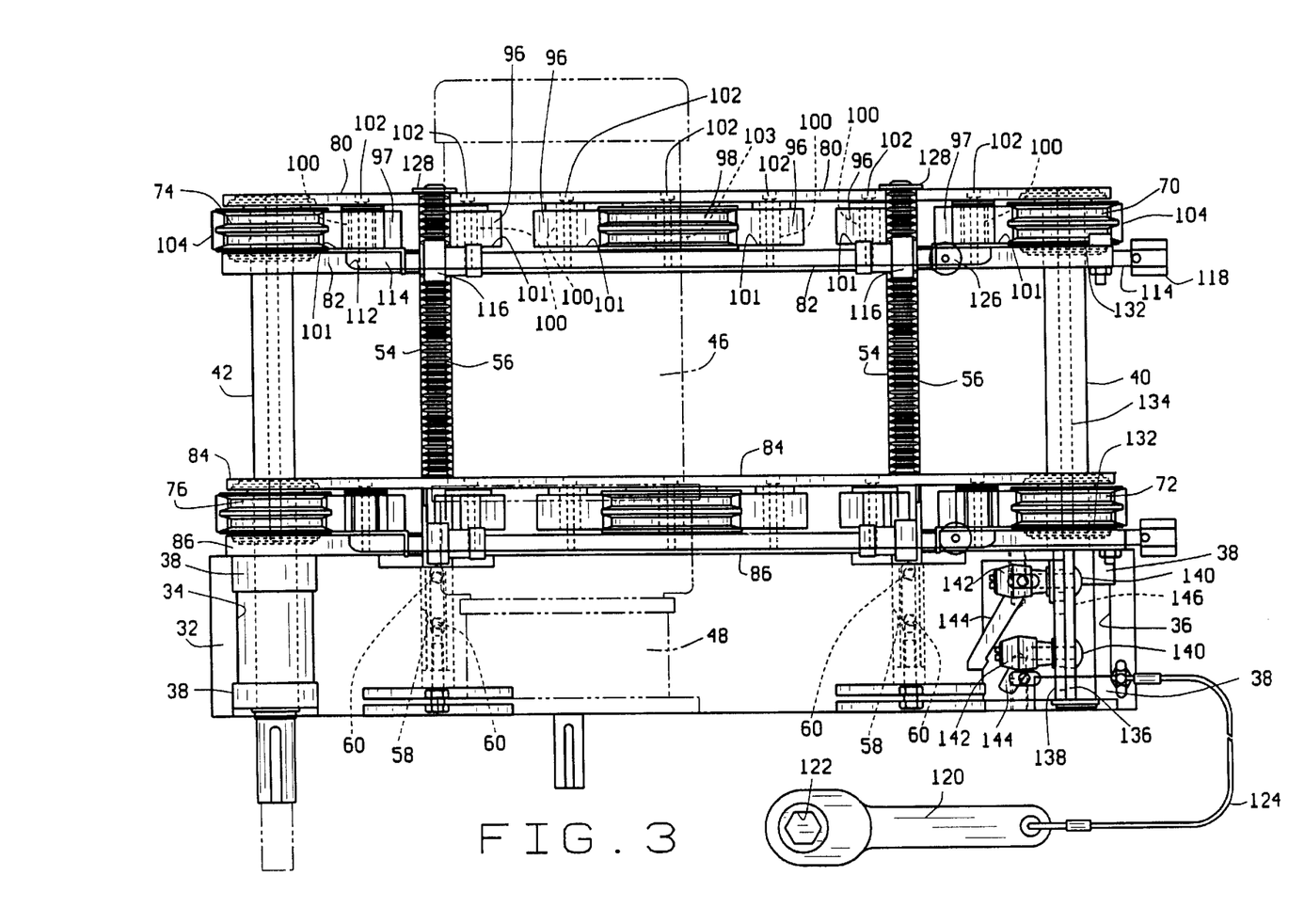
FIG. 3 is an enlarged, side elevation view of the horizontal belt conveyor of FIG. 2.
Figure 4:
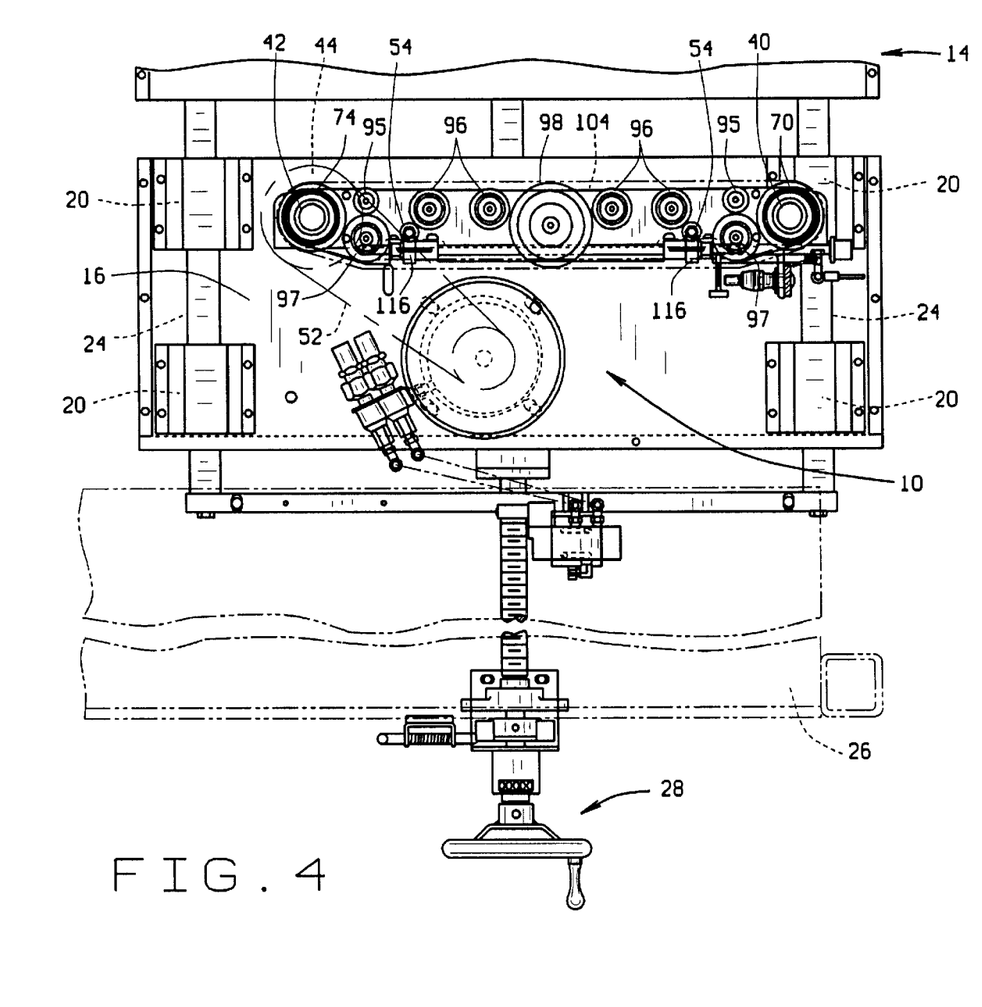
FIG. 4 is a top plan view of one of the horizontal belt conveyors.

Referring to FIG. 2, the conveyor is supported on a base 32 that is secured to one of the laterally adjustable table tops 16. The base 32 is a block of metal that has been machined to receive the component parts of the conveyor to be described. As shown in FIGS. 2 and 3, the base 32 is machined with two shaft holes 34, 36. Each shaft hole has a pair of bearings 38 inserted at its opposite ends. The bearings 38 mount an upstream vertical shaft 40 and a downstream vertical shaft 42 to the base for rotation of the shafts relative to the base. The shafts 40, 42 are mounted to the bearings 38 to prevent any vertical movement of the shafts relative to the bearings and to the base 32. One of the shafts, the downstream shaft 42 shown in the drawing figures, projects below the base 32 and has a shaft pulley 44 secured thereto.

The table top 16 also supports a motor 46 and a clutch/brake mechanism 48 of the motor. A drive shaft projects from the clutch/brake mechanism 48 below the table top 16 and has a drive pulley 50 affixed thereto. A drive belt 52 is wrapped around the drive pulley 50 and the shaft pulley 44 and on selective operation of the clutch/brake mechanism 48, the motor 46 rotates the downstream shaft 42 through the drive pulley 50.

Figure 7:
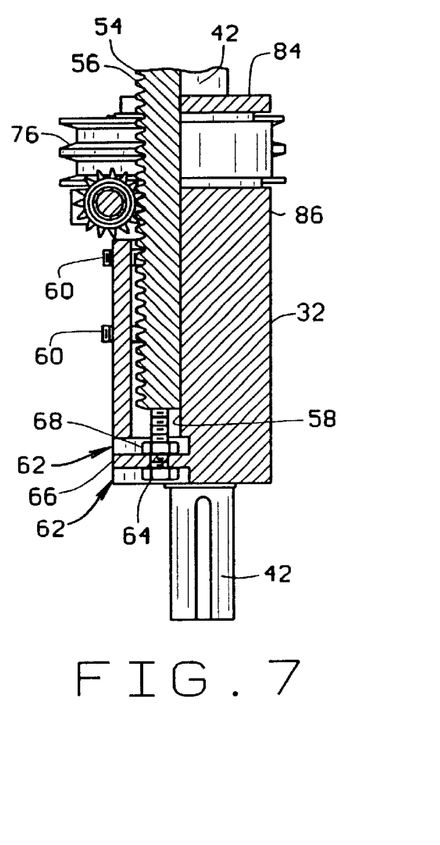
FIG. 7 is sectioned, end elevation view of one of the racks and its vertical adjustment mechanism.

The base 32 also supports a pair of vertical racks 54. The racks 54 are cylindrical metal rods that have horizontal gear teeth 56 cut across one side of the rack. The racks 54 are inserted into vertical holes 58 in the base and are secured in place by pairs of set screws 60 as shown in FIG. 7. A pair of grooves 62 are cut into the side of the base 32 to accommodate a vertical adjustment mechanism of the racks. The vertical adjustment mechanism includes a bolt 64 that extends through a hole in a flange 66 between the two slots 62 and is screw threaded into the bottom of the rack 54. A nut 68 is positioned on the bolt 64 and turning the nut to tighten it on the bolt locks the bolt in place. Loosening the nut and turning the bolt in opposite directions provides a fine vertical adjustment of the position of the rack 54 relative to the base 32. With the rack in its adjusted position the set screws 60 are tightened down to hold the rack in its adjusted position. The racks 54 are parts of a vertical adjustment mechanism that adjusts the positions of pulleys on the shafts 40, 42 as will be described.

An upper pulley 70 and the lower pulley 72 are mounted on the upstream vertical shaft 40 and an upper pulley 74 and the lower pulley 76 are mounted on the downstream vertical shaft 42. Each of the pulleys are shown as double pulleys, however single pulleys could also be employed. The upper pulley 70 on the upstream shaft 40 and the upper pulley 74 on the downstream shaft 42 are mounted between a pair of upper plates 80, 82. In a like manner, the lower pulley 72 on the upstream shaft 40 and the lower pulley 76 on the downstream shaft 42 are mounted between a pair of lower plates 84, 86. The upper plates 80, 82 and the lower plates 84, 86 are also mounted on the shafts 40, 42. The pairs of upper plates and the pairs of lower plates each support portions of the vertical adjustment mechanisms that adjust the vertical positions of the upper pulleys 70, 74 on the shafts 40, 42 and adjust the vertical positions of the lower pulleys 72, 76 on the shafts 40, 42. Because the vertical adjustment mechanisms supported by each pair of upper plates and lower plates are the same, only the vertical adjustment mechanism supported by the pair of upper plates 80, 82 positioned on opposite sides of the two upper pulleys 70, 74 will be described in detail.

Figure 6:
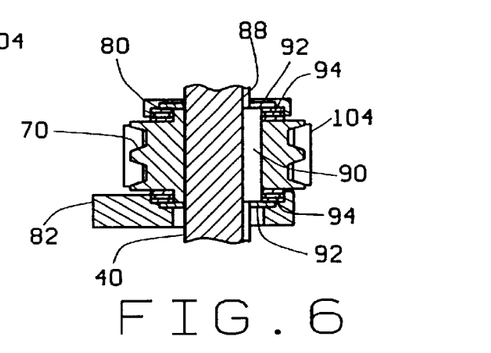
FIG. 6 is a sectioned, end elevation view of one of the pulleys sandwiched between a pair of plates.

FIG. 6 shows the manner in which the upper pulleys 70, 74 and the upper plates 80, 82 are mounted on the upstream shaft 40 and downstream shaft 42 for vertical sliding movement along the shafts. The shaft 40 has a keyway 88 formed in one side of the shaft. The pulley 70 is secured for rotation to the shaft 40 by a key 90 inserted in the keyway 88. The key 90 secures the pulley 70 to the shaft 40 for rotation of the pulley with the shaft, but permits the pulley 70 to slide axially along the length of the shaft 40. The upper plates 80, 82 have circular recesses formed in their mutually opposing surfaces and arbor shims 92 or hardened washers are received in the circular recesses. As shown in FIG. 6, the arbor shims 92 engage with opposite ends of the key 90 to move the key with the pulley. Annular thrust bearings 94 with hardened race washers positioned above and below the thrust bearing rollers are positioned between the arbor shims 92 and the opposite top and bottom surfaces of the pulley 70. Thus, the pulley 70 is free to rotate with the shaft 40 between the upper plates 80, 82 and will move axially along the shaft 40 as the upper plates 80, 82 are moved together upwardly and downwardly relative to the shaft.

Figure 5:
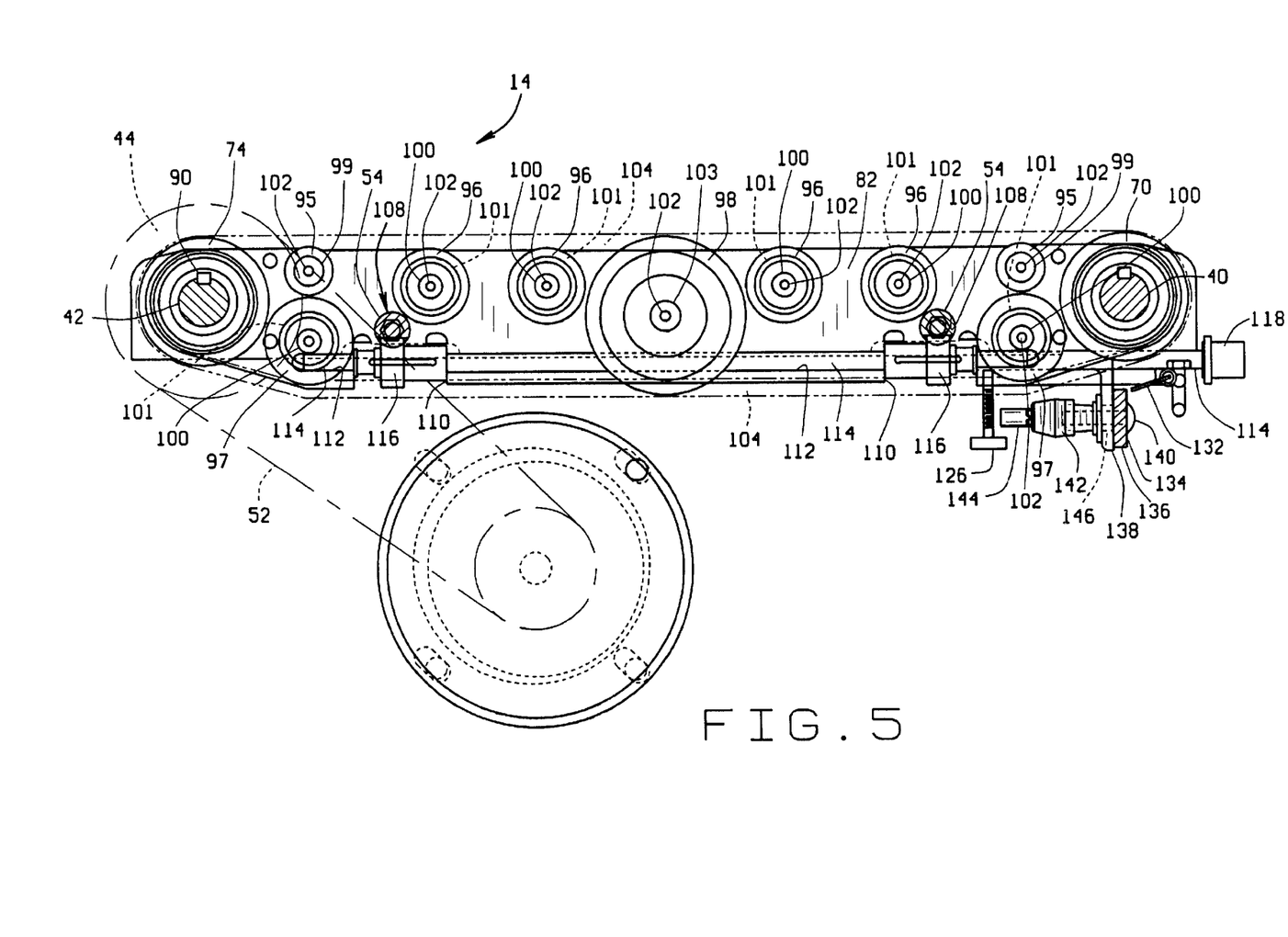
FIG. 5 is a plan view between the plates that sandwich the pulleys and belts of the conveyor with the top plate removed for clarity.

As shown in FIG. 5, in addition to the upper pulleys 70, 74 sandwiched between the upper plates 80, 82, a plurality of rollers 95, 96, 97 and an intermediate pulley 98 are also sandwiched between the plates. The two smaller rollers 95 near the pulleys 70, 74 are mounted on metal shafts 99. The four medium rollers 96 near the conveyor path 14 and the two largest rollers 97 near the pulleys are mounted on metal shafts 100 having enlarged circular flanges 101 at their bottom ends. Each of the rollers 95, 96, 97 are secured for rotation between the upper plates 80, 82 by bolts 102 that pass through the top upper plate 80 and the roller shafts 99 and roller shafts 100 and are screw threaded into the bottom upper plate 82. The rollers are mounted for rotation on the shafts 99 and shafts 100. Thus, the bolts 102 and the roller shafts 99 and shafts 100 function to maintain the upper plates 80, 82 in their vertically spaced relationship. The intermediate pulley 98 is also mounted on a shaft 103 secured between the upper plates 80, 82 by a bolt 102. As shown in FIG. 5, the belt 104 is stretched around the two upper pulleys 70, 74 at opposite ends of the plates 80, 82 and also around the rollers 95, 96, 97 and the intermediate pulley 98. A majority of the rollers 95, 96 function to maintain the portion of the belt 104 in the conveyor path 14 where it will continuously engage with objects conveyed through the conveyor path. In addition, the intermediate pulley 98 prevents the belt 104 from sagging horizontally intermediate the two upper pulleys 70, 74.

The upper plates 80, 82 also support a portion of the vertical adjustment mechanism that operates with the vertical racks 54 to adjustably move the plates 80, 82 upwardly and downwardly along the upstream and downstream shafts 40, 42 and thereby adjustably positions the upper pulleys 70, 74 along the upstream and downstream shafts 40, 42. As shown in FIG. 5, both the upper plates 80, 82 have holes 108 that receive the vertical racks 54 therethrough. Notches 110 are cut into the bottom upper plate 82 and intersect with portions of the rack holes 108, whereby the rack teeth 56 of the vertical racks 54 project into the notches 110. A groove 112 is cut into the top surface of the bottom upper plate 82 extending from its right end, intersecting the notches 110 and ending just short of the left end of the bottom upper plate 82 as shown in FIG. 5. A horizontal shaft 114 is laid in the groove 112 and is held in the groove by portions of the circular shaft flanges 101 of the two largest rollers 97 adjacent the upper pulleys 70, 74 that overlap the horizontal shaft 114 and the groove 112. A pair of gears 116 are fixed to the horizontal shaft 114 by keys (not shown). The gears 116 mesh with the rack teeth 56 of the vertical racks 54. Bushings and set collars are mounted on the horizontal shaft 114 in the notches 110 on opposites sides of the gears 116 preventing the gears from moving axially relative to the vertical racks 54 and preventing the horizontal shaft 114 from moving axially relative to the plate 82. A hex head 118 is secured to the end of the horizontal shaft 114 that projects from the plate 82. A ratchet wrench 120 having a hex socket 122 that is complementary to the hex head 118 is secured to the conveyor by a tether 124. By turning the hex head 118 in opposite directions with the ratchet wrench 120, the gears 116 are caused to rotate over the rack teeth 56 of the vertical racks 54. Rotation of the gears 116 in opposite directions causes the gears meshing with the rack teeth 56 to push the upper plates 80, 82 and the pulleys 70, 74 between the plates upwardly and downwardly along the lengths of the upstream and downstream shafts 40, 42. In this manner, the vertical positions of the pulleys 70, 74 on the shafts 40, 42 can be easily and quickly adjusted. When the pulleys are in their adjusted positions, a screw threaded knob 126 mounted on the edge of the bottom upper plate 82 can be tightened down against the horizontal shaft 114 of the adjustment mechanism to hold the horizontal shaft 114 against rotation and thereby hold the pulleys 70, 74 in their adjusted positions on the vertical shafts 40, 42. Each of the vertical racks 54 are provided with caps 128 at their top ends to prevent the upper plates 80, 82 and the upper pulleys 70, 74 from being adjusted too high on the vertical shafts 40, 42.

Figure 8:
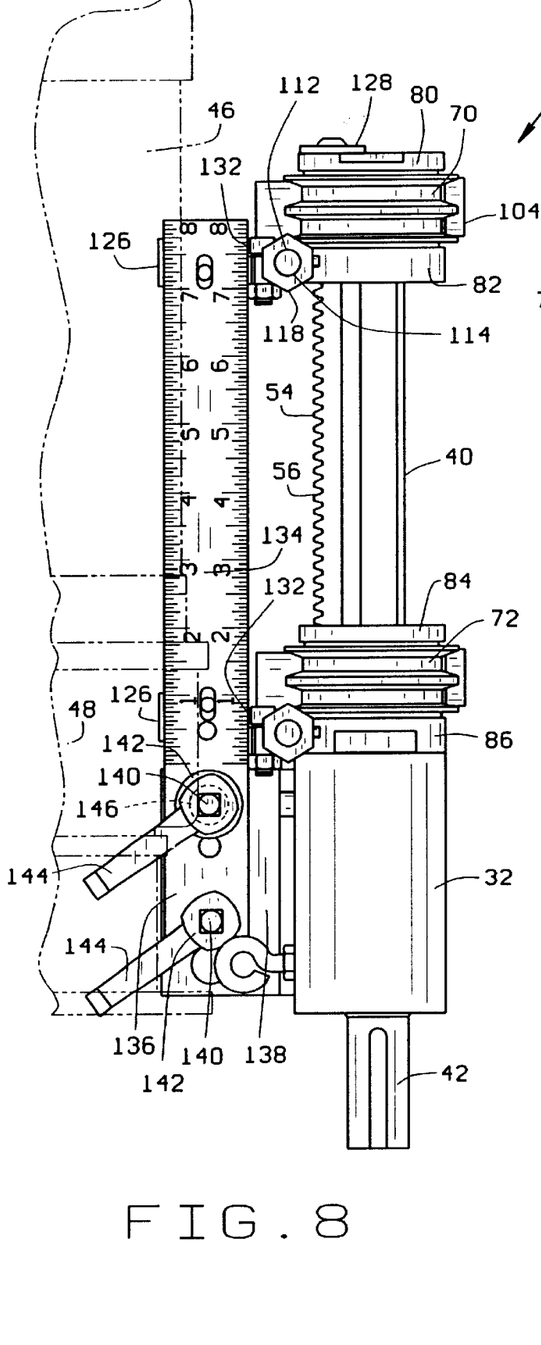
FIG. 8 is an end elevation view of the scale of the invention.

Each of the bottom plates 82 have pointers 132 secured thereto that, together with a vertical scale 134, provide a visual indication of the adjusted position of the pulleys on their shafts. As shown in FIGS. 5 and 8, the pointers 132 are secured to each of the bottom plates 82 in positions pointing out toward an edge of the scale 134. The scale 134 is mounted on a vertical bar 136 that is secured to an angle bar 138 at its bottom end by a pair of bolts 140 screw threaded into female ratchets 142 with handles 144. The lower of the two bolts 140 passes through a hole in the vertical bar 136 just large enough to accommodate the bolt. The upper of the two bolts 140 passes through a larger hole 146 in the bar 136. The larger hole 146 is provided so that both of the ratchets 142 can be loosened and the vertical bar 136 and scale 134 can be pivoted about the lower bolt 140 outwardly away from the shafts and pulleys. This provides more clearance between the scale 134 and adjacent parts of the conveyor such as the pulleys 70, 72, the pointer 132 and the knobs 126 to enable belts to be more easily removed from the pulleys and replaced on the pulleys as needed.

Although only the vertical adjustment mechanism of the upper pulleys 70, 74 of the first conveyor 10 is described above, it should be understood that the vertical adjustment mechanisms of the upper pulleys 70, 74 and lower pulleys 72, 76 for both conveyor systems 10, 12 on opposite sides of the conveyor path 14 are the same. The vertical adjustment mechanisms of the invention enable the vertical positions of the pulleys on the upstream shaft 40 and downstream shaft 42 to be quickly and easily adjusted, thereby reducing down time of the overall conveyor system improving its time efficiency.

While the present invention has been described by reference to specific a embodiment, it should be understood that modifications and variations of the invention may be constructed without departing from the scope of the invention defined in the following claims.

What is claimed:

1. A conveyor for conveying containers, each container having an upper portion and a lower portion, the conveyor comprising:
   a first pair of vertical shafts and a second pair of vertical shafts, the first and second pairs of shafts being positioned on opposite sides of a conveyor path of the conveyor;
   a first pair of lower pulleys, each adjustably mounted on one of the first pair of vertical shafts;
   a first pair of upper pulleys, each adjustably mounted on one of the first pair of vertical shafts above the first pair of lower pulleys;
   a second pair of lower pulleys, each adjustably mounted on one of the second pair of vertical shafts;
   a second pair of upper pulleys, each adjustably mounted on one of the second pair of vertical shafts above the second pair of lower pulleys;
   a first vertical adjustment mechanism operatively connected between the first pair of lower pulleys and the first pair of upper pulleys for adjusting a vertical spacing between the first pair of lower pulleys and the first pair of upper pulleys; and
   a second vertical adjustment mechanism operatively connected between the second pair of lower pulleys and the second pair of upper pulleys for adjusting a vertical spacing between the second pair of lower pulleys and the second pair of upper pulleys.

2. The conveyor of claim 1, wherein:
   the first pair of lower pulleys and the first pair of upper pulleys are mounted on the first pair of vertical shafts to rotate with and to slide along the first pair of vertical shafts.

3. The conveyor of claim 2, wherein:
   the first pair of vertical shafts have keyways and the first pairs of lower pulleys and upper pulleys are mounted on the first pair of vertical shafts to rotate with the first pair of vertical shafts by keys that engage in the keyways.

4. The conveyor of claim 3, wherein:
   the keys are received in the keyways for sliding movement, enabling the first pairs of lower pulleys and upper pulleys to slide along the first pair of vertical shafts.

5. The conveyor of claim 2, wherein:
   the second pair of lower pulleys and the second pair of upper pulleys are mounted on the second pair of vertical shafts to rotate with and to slide along the second pair of vertical shafts.

6. The conveyor of claim 5, wherein:
   the second pair of vertical shafts have keyways and the second pairs of lower pulleys and upper pulleys are mounted on the second pair of vertical shafts to rotate with the second pair of vertical shafts by keys that engage in the keyways.

7. The conveyor of claim 6, wherein:
   the keys are received in the keyways for sliding movement, enabling the second pairs of lower pulleys and upper pulleys to slide along the second pair of vertical shafts.

8. A conveyor for conveying containers, each container having an upper portion and a lower portion, the conveyor comprising:
   a first pair of vertical shafts and a second pair of vertical shafts, the first and second pairs of shafts being positioned on opposite sides of a conveyor path of the conveyor;
   a first pair of lower pulleys, each adjustably mounted on one of the first pair of vertical shafts;
   a first pair of upper pulleys, each adjustably mounted on one of the first pair of vertical shafts above the first pair of lower pulleys;
   a second pair of lower pulleys, each adjustably mounted on one of the second pair of vertical shafts;
   a second pair of upper pulleys, each adjustably mounted on one of the second pair of vertical shafts above the second pair of lower pulleys;
   a first vertical adjustment mechanism operatively connected between the first pair of lower pulleys and the first pair of upper pulleys for adjusting a vertical spacing between the first pair of lower pulleys and the first pair of upper pulleys;
   a second vertical adjustment mechanism operatively connected between the second pair of lower pulleys and the second pair of upper pulleys for adjusting a vertical spacing between the second pair of lower pulleys and the second pair of upper pulleys; and
   a first pair of lower plates are mounted on the first pair of vertical shafts for sliding movement of the first pair of lower plates along the first pair of vertical shafts, the first pair of lower pulleys are positioned between the first pair of lower plates.

9. The conveyor of claim 8, wherein:
   the first vertical adjustment mechanism is operatively connected to the first pair of lower plates to selectively move the first pair of lower plates upwardly and downwardly along the first pair of vertical shafts and thereby slide the first pair of lower pulleys upwardly and downwardly on the first pair of vertical shafts.

10. The conveyor of claim 8, wherein:
    the first vertical adjustment mechanism includes a vertical rack and a gear mounted for rotation on one of the first pair of lower plates and meshing with the vertical rack, whereby selective rotation of the gear in opposite directions moves the gear upwardly and downwardly along the rack and thereby moves the first pair of lower plates and the first pair of lower pulleys therebetween upwardly and downwardly along the rack and along the first pair of vertical shafts.

11. The conveyor of claim 8, wherein:
    the first pair of lower plates are parallel plates that both extend between and are mounted on the first pair of vertical shafts for sliding movement of the first pair of lower plates on the first pair of vertical shafts.

12. The conveyor of claim 8, wherein:
    a first pair of upper plates are mounted on the first pair of vertical shafts for sliding movement of the first pair of upper plates along the first pair of vertical shafts, the first pair of upper pulleys are positioned between the first pair of upper plates.

13. The conveyor of claim 12, wherein:

the first vertical adjustment mechanism is operatively connected to the first pair of upper plates to selectively move the first pair of upper plates upwardly and downwardly along the first pair of vertical shafts and thereby slide the first pair of upper pulleys upwardly and downwardly on the first pair of vertical shafts.

14. The conveyor of claim 12, wherein:

the first vertical adjustment mechanism includes a gear mounted for rotation on one of the first pair of upper plates and meshing with the vertical rack, whereby selective rotation of the gear in opposite directions moves the gear upwardly and downwardly along the rack and thereby moves the first pair of upper plates and the first pair of upper pulleys therebetween upwardly and downwardly along the rack and along the first pair of vertical shafts.

15. The conveyor of claim 12, wherein:

the first pair of upper plates are parallel plates that both extend between and are mounted on the first pair of vertical shafts for sliding movement of the first pair of upper plates on the first pair of vertical shafts.

16. The conveyor of claim 12, wherein:

the first vertical adjustment mechanism is operatively connected to the first pair of lower plates and the first pair of upper plates to selectively move the first pair of lower plates and the first pair of upper plates upwardly and downwardly along the first pair of vertical shafts independently of each other and thereby slide the first pair of lower pulleys and the first pair of upper pulleys upwardly and downwardly on the first pair of vertical shafts independently of each other.

17. The conveyor of claim 12 wherein:

the first vertical adjustment mechanism includes a pair of vertical racks, a pair of lower gears mounted for rotation on one of the first pair of lower plates and meshing with the pair of racks and a pair of upper gears mounted for rotation on one of the first pair of upper plates and meshing with the pair of racks, whereby selective rotation of the pair of lower gears in opposite directions moves the pair of lower gears upwardly and downwardly along the pair of racks and thereby moves the first pair of lower plates and the first pair of lower pulleys therebetween upwardly and downwardly along the pair of racks and along the first pair of vertical shafts and selective rotation of the pair of upper gears in opposite directions moves the pair of upper gears upwardly and downwardly along the pair of racks and thereby moves the first pair of upper plates and the first pair of upper pulleys therebetween upwardly and downwardly along the pair of racks and along the first pair of vertical shafts.

18. A conveyor for conveying containers, each container having an upper portion and a lower portion, the conveyor comprising:

a first pair of vertical shafts and a second pair of vertical shafts, the first and second pairs of shafts being positioned on opposite sides of a conveyor path of the conveyor;

a first pair of lower pulleys, each adjustably mounted on one of the first pair of vertical shafts;

a first pair of upper pulleys, each adjustably mounted on one of the first pair of vertical shafts above the first pair of lower pulleys;

a second pair of lower pulleys, each adjustably mounted on one of the second pair of vertical shafts;

a second pair of upper pulleys, each adjustably mounted on one of the second pair of vertical shafts above the second pair of lower pulleys;

a first vertical adjustment mechanism operatively connected between the first pair of lower pulleys and the first pair of upper pulleys for adjusting a vertical spacing between the first pair of lower pulleys and the first pair of upper pulleys;

a second vertical adjustment mechanism operatively connected between the second pair of lower pulleys and the second pair of upper pulleys for adjusting a vertical spacing between the second pair of lower pulleys and the second pair of upper pulleys; and a first vertical scale is positioned adjacent one of the first pair of vertical shafts and a second vertical scale is positioned adjacent one of the second pair of vertical shafts, and the first vertical scale and the second vertical scale have markings indicative of a vertical spacing between the first pair of lower pulleys and the first pair of upper pulleys and indicative of a vertical spacing between the second pair of lower pulleys and the second pair of upper pulleys, respectively.

19. The conveyor of claim 18, wherein:

the first scale is moveable away from the first pair of upper pulleys to enable a belt to be passed therebetween and the second scale is moveable away from the second pair of upper pulleys to enable a belt to be passed therebetween.

20. The conveyor of claim 18, wherein:

the first scale is pivotable away from the first pair of upper pulleys to enable a belt to be passed therebetween and the second scale is pivotable away from the second pair of upper pulleys to enable a belt to be passed therebetween.

* * * * *